(12) United States Patent
Wallace

(10) Patent No.: US 11,261,618 B1
(45) Date of Patent: Mar. 1, 2022

(54) INTERACTIVE DOOR KNOB

(71) Applicant: Edmond Wallace, San Juan, PR (US)

(72) Inventor: Edmond Wallace, San Juan, PR (US)

( * ) Notice: Subject to any disclaimer, the term of this patent is extended or adjusted under 35 U.S.C. 154(b) by 104 days.

(21) Appl. No.: 16/815,765

(22) Filed: Mar. 11, 2020

Related U.S. Application Data

(63) Continuation-in-part of application No. 15/607,547, filed on May 29, 2017, now Pat. No. 10,638,095.

(51) Int. Cl.
*E05B 1/00* (2006.01)
*E05B 17/10* (2006.01)
*E05B 17/00* (2006.01)

(52) U.S. Cl.
CPC ............ *E05B 1/0084* (2013.01); *E05B 1/003* (2013.01); *E05B 17/0083* (2013.01); *E05B 17/10* (2013.01)

(58) Field of Classification Search
CPC .......... E05B 1/00; E05B 1/003; E05B 1/0084; E05B 17/00; E05B 17/0079; E05B 17/0083; E05B 17/0087; E05B 17/10; E05B 17/22223
USPC ...................................................... 292/336.3
See application file for complete search history.

(56) References Cited

U.S. PATENT DOCUMENTS

| | | | |
|---|---|---|---|
| 3,725,892 A | 4/1973 | Faltico | |
| 3,733,861 A * | 5/1973 | Lester | G07C 9/00182 70/153 |
| 3,788,107 A | 1/1974 | Lippman | |
| 4,100,539 A | 7/1978 | Stahl et al. | |
| 5,518,404 A | 5/1996 | Steele | |
| 6,104,288 A | 8/2000 | Hopkins | |
| 8,590,182 B2 * | 11/2013 | Federkevic | G09F 3/00 40/124.03 |
| 8,912,903 B1 * | 12/2014 | Dounis | G08B 13/08 340/546 |
| 9,663,966 B1 * | 5/2017 | Wallace | E05B 1/0007 |
| 9,885,588 B2 * | 2/2018 | Misfatto | E05B 39/00 |
| 2007/0146153 A1 | 6/2007 | LaFleur et al. | |
| 2016/0050399 A1 * | 2/2016 | Chuter | H04N 7/186 348/155 |

OTHER PUBLICATIONS

A3141, A3142, A3143, and A3144 Data Sheets, Allegro.
Application Note AN104, Hamlin.

* cited by examiner

*Primary Examiner* — Nathan Cumar
(74) *Attorney, Agent, or Firm* — Luis Figarella

(57) ABSTRACT

A door knob assembly that provides an interactive visual and aural assembly familiar to a room occupant and that responds to variations in the manner of rotation of the knob in a plurality of responses, depending on the direction and rate of rotation applied to the knob, providing messages appropriate to the entertainment, safety and/or training of the knob operator and/or room occupant.

4 Claims, 8 Drawing Sheets

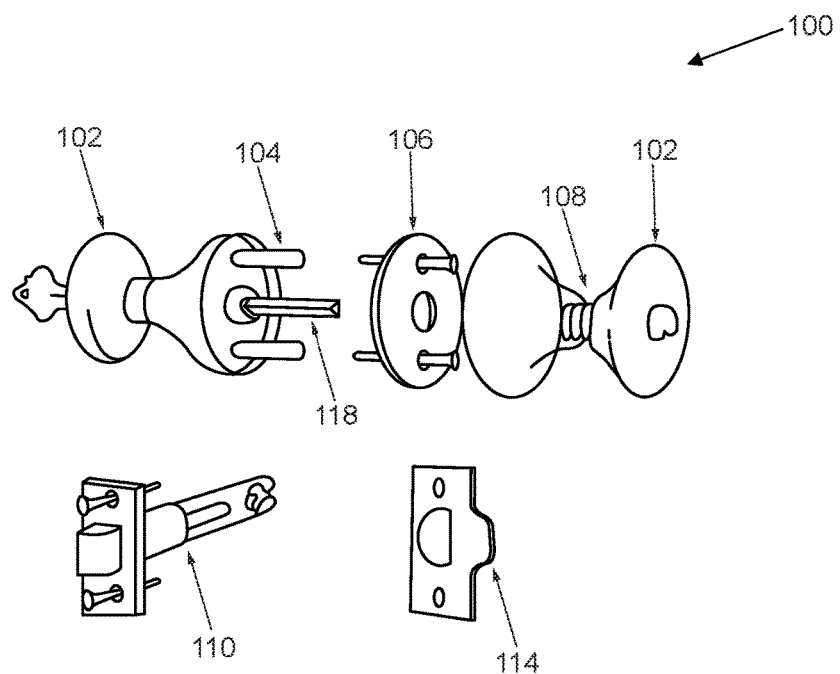
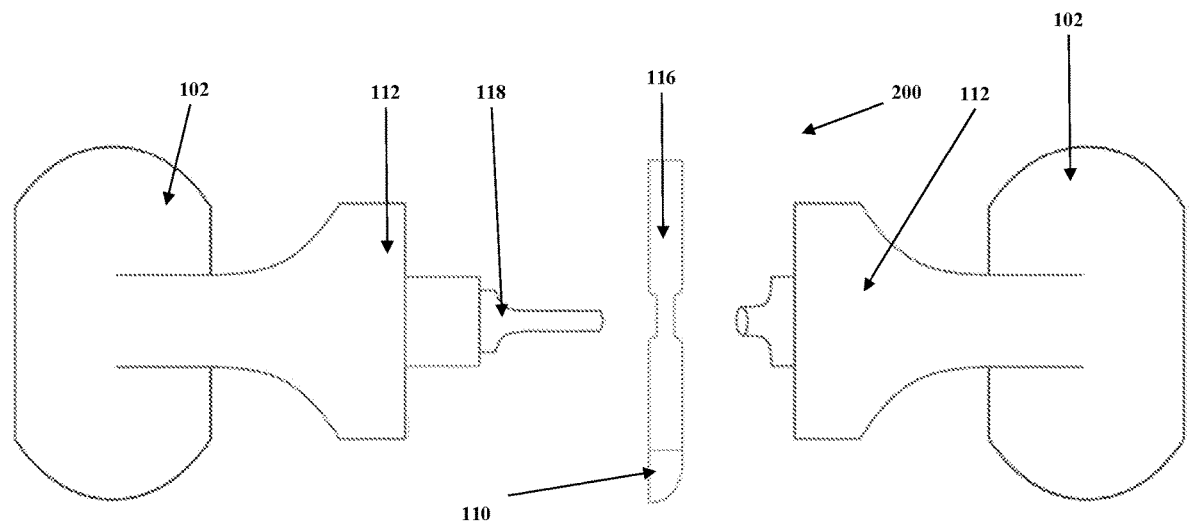
Figure 1
Prior Art
Figure 2

INTERACTIVE DOOR KNOB

CROSS-REFERENCE TO RELATED APPLICATIONS

This application is a Continuation in Part of pending U.S. patent application Ser. No. 15/607,547 titled "Interactive Knob Talk", filed on May 29, 2017 the disclosure of which is herein incorporated by reference in its entirety.

PATENTS CITED

The following documents and references are incorporated by reference in their entirety, Steele (U.S. Pat. No. 5,518,404), Hopkins (U.S. Pat. No. 6,104,288), Dounis (U.S. Pat. No. 8,912,903), Faltico (U.S. Pat. No. 3,725,892), Federkevic et al (U.S. Pat. No. 8,590,182), Lippman (U.S. Pat. No. 3,788,107), Stahl et al (U.S. Pat. No. 4,100,539) and LaFleur et al (US Pat. Appl. Pub. No. 2007/0146153).

FIELD OF THE INVENTION

The present invention relates to a door knob assembly that provides an interactive visual and aural assembly familiar to a room occupant and that responds to variations in the manner of rotation of the knob in a plurality of responses, depending on the direction and rate of rotation applied to the knob, providing selection from a plurality of pre-recorded messages and/or display behavior appropriate to the entertainment, safety and/or training of the knob operator and/or room occupant.

DESCRIPTION OF THE RELATED ART

The traditional door knob is a utilitarian design that has evolved over centuries, primarily designed for the utilitarian functionality that turning/twisting a knob results in the mechanical release of a latch mechanism keeping the door closed. In some rooms, such as children's, decorators and parents sometimes take care to create a particular friendly decor and environment.

The above sometime occurs with window coverings, bedspreads, pillows, rugs, furniture, wall covering, pictures and even light switch cover plates, which are selected with a theme, or with a specific purpose. However, the door knob, even in these days of electronic interoperability, has been essentially abandoned. With the exception of Steele (U.S. Pat. No. 5,518,404) who proposes a creative talking doorknob, but which suffers from the limitations of having two operating modes (as it depends on a 'tilting' switch, and thus makes operation a function of the direction in which the door knob is twisted.

There exists in the market a demonstrated necessity for detection of a door operation/action (both for children and elders) as well as a need to provide inside/outside aural (sound) and light entertainment in addition to decorative features.

The disclosure thus, includes an extension of the functionality of the doorknob beyond the mere prior art functionality of controlling a door movement, providing educational, entertaining and decorative value in a device that may promote household safety as well.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect the invention is about a door knob assembly comprising, one or more knobs, a spindle or shaft connected to said one or more knobs, said spindle extending through a deadlatch mechanism for door latch actuation, knob rotation sensing components comprised of an accelerometer and electronics components capable of integrating the rate of rotation of said knob and a power source. In another aspect, said electronic components activate the sound features of the system when said knob is rotated past a certain angle and/or when said knob is rotated at a rate faster than a predetermined rate. In yet another aspect, at least one said knob is equipped with Light Emitting Diodes (LEDs) and/or speakers driven by said activation stage electronic component's activation, so that power up and direction of rotation may be used by the system electronics in generating one or more pre-determined audio and/or visual responses. In another aspect, all or parts of the system electronics are housed within an electronic assembly designed to fit within one or more electronic removable media slot.

Other features and advantages of the present invention will become apparent upon examining the following detailed description of an embodiment thereof, taken in conjunction with the attached drawings.

BRIEF DESCRIPTION OF THE DRAWINGS

FIG. 1 shows an illustration of the prior art for door knobs, as well as component terminology.

FIG. 2 shows a top view illustration of the overall door knob components, according to an exemplary embodiment of the invention.

Figure 3:
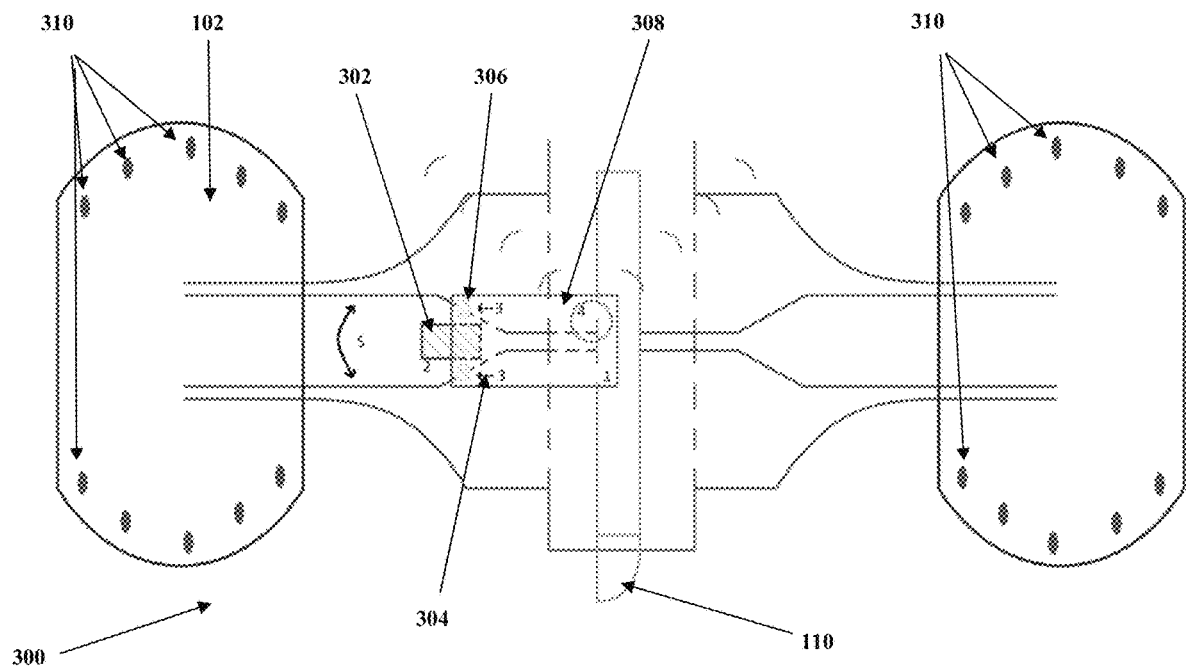
FIG. 3 shows a top view illustration of the magnetic effect door knob, according to an exemplary embodiment of the invention.

The above-described and other features will be appreciated and understood by those skilled in the art from the following detailed description, drawings, and appended claims.

DETAILED DESCRIPTION OF THE PREFERRED EMBODIMENT

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Referring to FIG. 1 we see the traditional door knob components 100 and their terminology. We see the outside and/or inside knob 102, which rotate the shaft or spindle 118. The spindle 118 is keyed, so that its rotation is converted in the linear motion of the dead-latch 116, which actuates the latch 110 that holds the door closed. The strike plate 114 is usually mounted on the door frame (not on the door as are the above components). The knobs 102 rotate around the rose cover or trim 112 which is held steady (non-rotating) through the attachment of the screw posts 104, through the rose insert 106 to the rose cover 112.

Referring to FIG. 2, we see the top view of these components, according to an exemplary embodiment of the invention. We see the knob 102 (in one embodiment being the inside knob, but which may be also on the outside knob 102 and/or on both inside/outside knobs 102). We note that the knob 102 rotates around the trim 112, and being directly connected to the spindle 118. During normal use, the rotation of the knob 102 opens the latch 110. We note that in many cases, the knob is not 'round' as shown, but is a lever and/or one of a myriad of designs capable of rotating said spindle 118.

By using internal electronic components, the proposed system expands on the basic mechanism for opening a door, while allowing the user to determine the type and level of interaction with the knob/door. The shape of the knob 102 may be formed in any particular form (from the traditional/modern forms, to characters or memes). When the rotation of the knob 102 causes the rotation of the spindle 118, the system has knob rotation sensing means comprised of mechanical/electronic components that detect both the motion and the rate of motion of said knob, activating a programmable system response.

Figure 4:
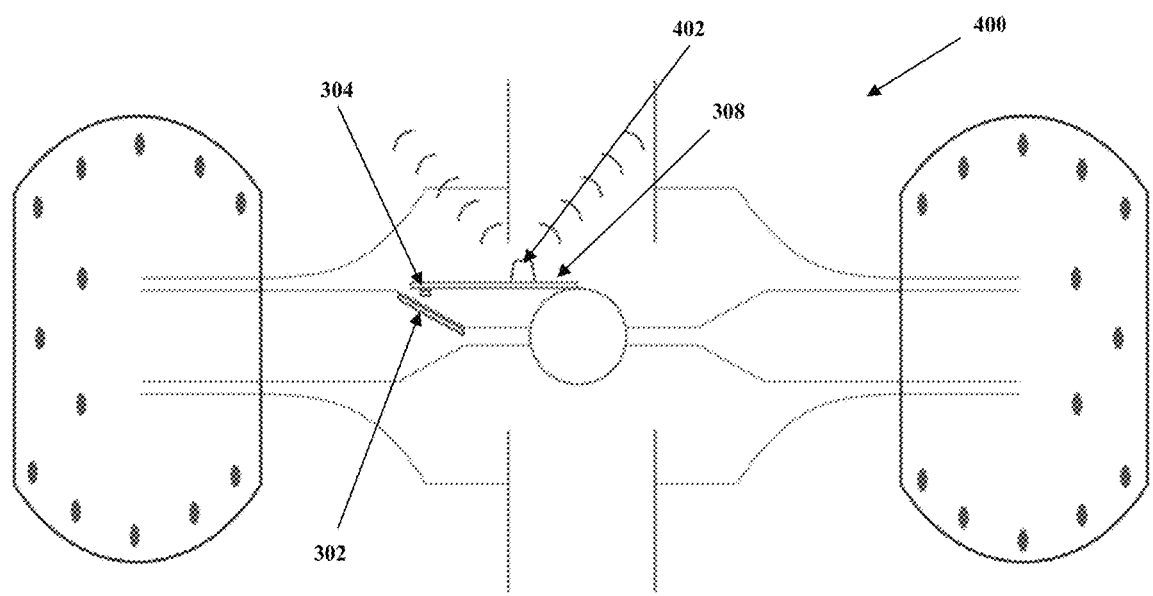
FIG. 4 shows a side view illustration of the magnetic effect door knob, according to an exemplary embodiment of the invention.

Referring to FIGS. 3-4, we see an exemplary embodiment of the invention (top view 300 and side view 400) that utilizes knob rotation detection means capable of determining both the direction and rate of rotation of the knob through the detection/duration of the presence/absence of one or more magnets 302 located within the central spindle 118 structure or an extension of it that is coaxial to the spindle 118, so that as a result of the rotation of the knob 102, the resulting rotation of the spindle 118 causes the magnet to rotate in space and move past one or more sensors 304, 306 placed on each side of said magnet's path. Note the magnets 302 may be located above, within or below the surface of the spindle assembly, as long as the magnetic signal is enough to reach the sensors 304, 306.

In another embodiment, the sensors 304, 306 are Reed switches (such as the Hamlin AN104), also known as presence sensors, which are activated by the magnets 302 presence, so that the magnet 302 passing either opens or closes the circuits that activate the electronics. In one embodiment, the electronics operate on the simple activation of the sensor 304, 306 so that they the electronics 308 are limited to the detection of knob rotation direction (in one example embodiment, activation of 302 implies rotation of the knob to the right, activation of sensor 304 implies rotation to the left).

In an alternate embodiment, the knob detection rotation means are comprised of one or more hall effect sensors 304, 306 (such as Allegro Electronics A3141 or similar) mounted to detect the passing of the magnet 302 (in one embodiment), as well as in another both the passing and the rate of speed of the magnet's 302 passing. These sensors 304, 306 will activate when the magnet strip moves under them. As it is only one magnetic strip moving with the rotational rod or spindle 118, the electronic module will activate a different sound if moved clockwise or counterclockwise. The Hall Effect sensors will also activate the electronic switch which will stay energizing the entire electronic module and peripherals while the sounds and lights are activated.

Note that while in these examples the strip or magnet 302 is shown on the shaft, the component positions may be reversed, so that the strip/magnet 302 is in the fixed position (as is the control electronics, mounted on the dead-latch assembly 116, door, trim 112 and/or other affixed portions) while the sensors 304, 306 and/or other electronics 308 rotate.

In one embodiment, the first time the knob is turned, the system may 'wake up', remaining in different modes as required. After a certain amount of inaction, in one embodiment the system powers down to save energy, deactivating the LED and sounds.

In a simple embodiment, the sensors 304, 306 are contact sensors, which are an either an open or closed circuits, so that instead of a magnet 302, the activation performed when a notch or bump in said shaft 118 passes by the sensor (whether the sensor is mounted in the shaft or in any of the fixed portions of the mechanism, like the dead-latch and/or the trim.

In another embodiment, all or portion of the shaft has simple electrical contact sensors comprised of electrically conducive protrusions, sticks and/or strips of material placed over it, so that rotation of said shaft or spindle 118 causes the electrical portion to come in contact with portions of the sensor 304, 306 (be it because the protrusion, stick, point or strip is located in either the rotating portion (shaft/spindle) or the stationary one. In this fashion, the rotation of the spindle or shaft passes the contact past the sensor, which either opens or closes a circuit, activating the control electronics 308 within the system control unit.

In an alternate embodiment, the passage of the circuit opens or closes the circuit, and the control electronics 308 are activated by the transition (that is, the leading edge of the electric activity) so that the user releasing the handle or knob 102 back to its neutral position does not affect the already started operation. Note the arrangement may be reversed, with the sensors 304, 306 mounted on said shaft/spindle 118, with the one or more electrical portions in the affixed location.

In another embodiment, the control electronics track not only operation, but the amount of time the sensor was exposed to the magnet and/or the mechanical/electrical contacts were activated. Since the geometry is known (magnet 302 location, size, distance to sensors 304, 306), the exposure time to the magnetic effect on the sensor provides you with a proportional idea of the 'speed of rotation'. At least two modes are possible, slow or fast, and three are simple ('slow' being activation taking longer than X-microseconds to deactivation, 'normal' is about Y-microseconds and 'fast' is less than Z-microseconds). That combined with the direction of travel, provides the system with multiple different activation modes of voice/LED levels. In one particularly entertaining mode, the LEDs 310 may be made to behave like a roulette wheel and/or a pachinko machine.

Once the internal electronic module has recognized the movement direction, it proceeds to play a prerecorded sound (stored in system memory and/or synthesized from system memory parameters) and/or activating one or more of the system Light Emitting Diodes (LEDs) 310 in a specific pattern in one or both knobs 102. All forms of combinations are possible, so that while the sound is playing a series of led or lights will activate, making the knob react to the theme as programmed. In one embodiment, the electronic module 308 has at least two prerecorded sounds and the magnetic sensors to recognize the movement of the door knob and a speaker 402 to play the sounds.

Note that other connectivity may be accomplished, this includes wireless connectivity, such as Wi-Fi, Bluetooth, Near Field Communications (NFC) and other such protocols, which would allow the activation of the system to be communicated with the parent's, child cellphone/smartphone as well as to a security system.

The electronic means include one or more electronic modules 308 that have audio message generating/delivering means comprised of a microcircuit for synthesizing, generating, storing and/or replaying one or more recorded/programmable audio messages internally contained within said electronics CPU/Memory, audio speaker and/or microphone. In addition, a number of power sources may be available. These include a battery, photovoltaic cells and/or a combination thereof. In one embodiment, the electronic means have an internal electronic switch/timer that powers the whole board for a programmable amount of time, then shuts down all electronics, and/or all but the knob sensing means (at a power level capable of facilitating long battery life).

The electronics contain audio message generating means further comprise a microcircuit for storing and releasing one or any of a plurality of electronic messages, each associated with the childhood character of the knob, the source of electrical energy for operating the microcircuit, actuating means for sensing an angular displacement of the turn able decorative knob and thereby transitioning from an open or non-conductive state to a closed or conductive state and actuating the microcircuit for releasing one of the stored messages, and energy conversion means for converting the electronic message to an audible message and projecting said audible message into the child's room.

In one embodiment, to prevent the extended use of the energy storage, the system is activated by the activation of a timer circuit energized when the presence/hall effect or mechanical/electrical contact is activated. This powers the control electronics completely down until the system is activated, maximizing the electronics battery life.

Figure 5:
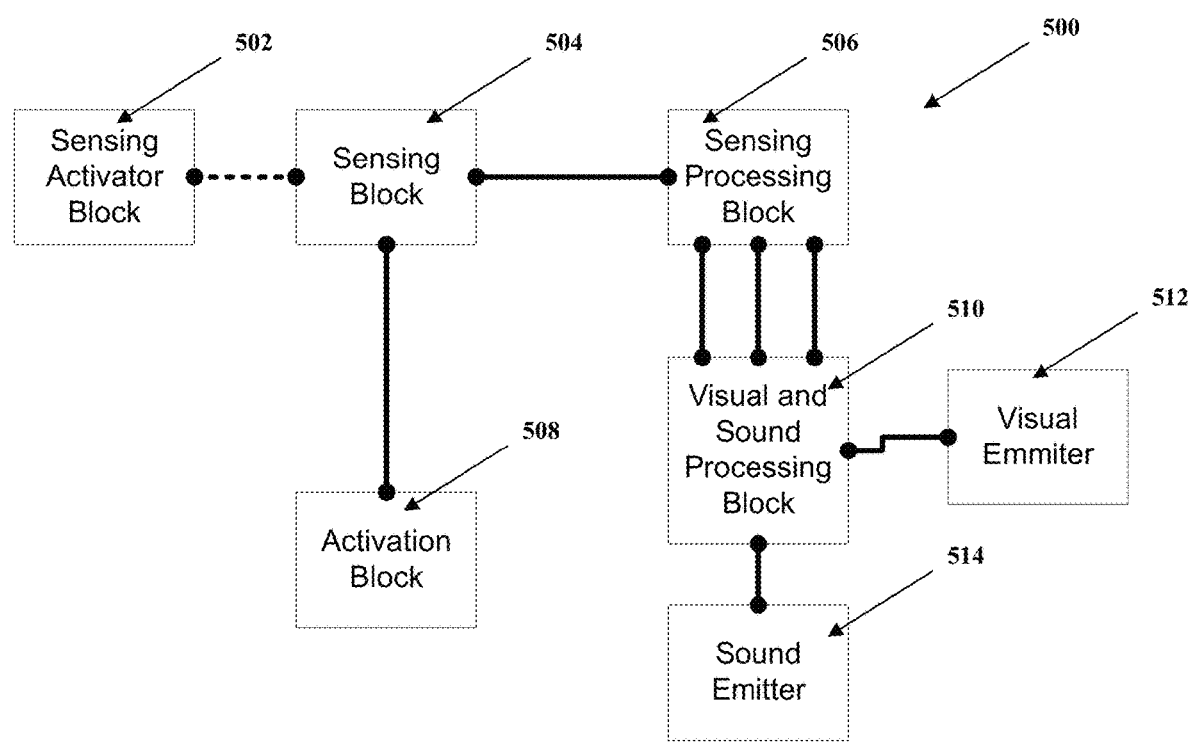
FIG. 5 shows a block diagram of the door knob electronic components, according to an exemplary embodiment of the invention.

Referring to FIG. 5 we see a block diagram 500 of the various system components, according to an exemplary embodiment. The sensing activator 502, sensing block 504, sensing processing block 506 and the activation block 508 are the system electronics which perform the knob rotation detection means, and upon said knob motion, proceed to 'wake-up'/notify the control/processing electronics 308, which then generate 510 the appropriate sound 514 (through the speaker 402) and/or lights 512 through the one or more LEDs 310.

Figure 6:
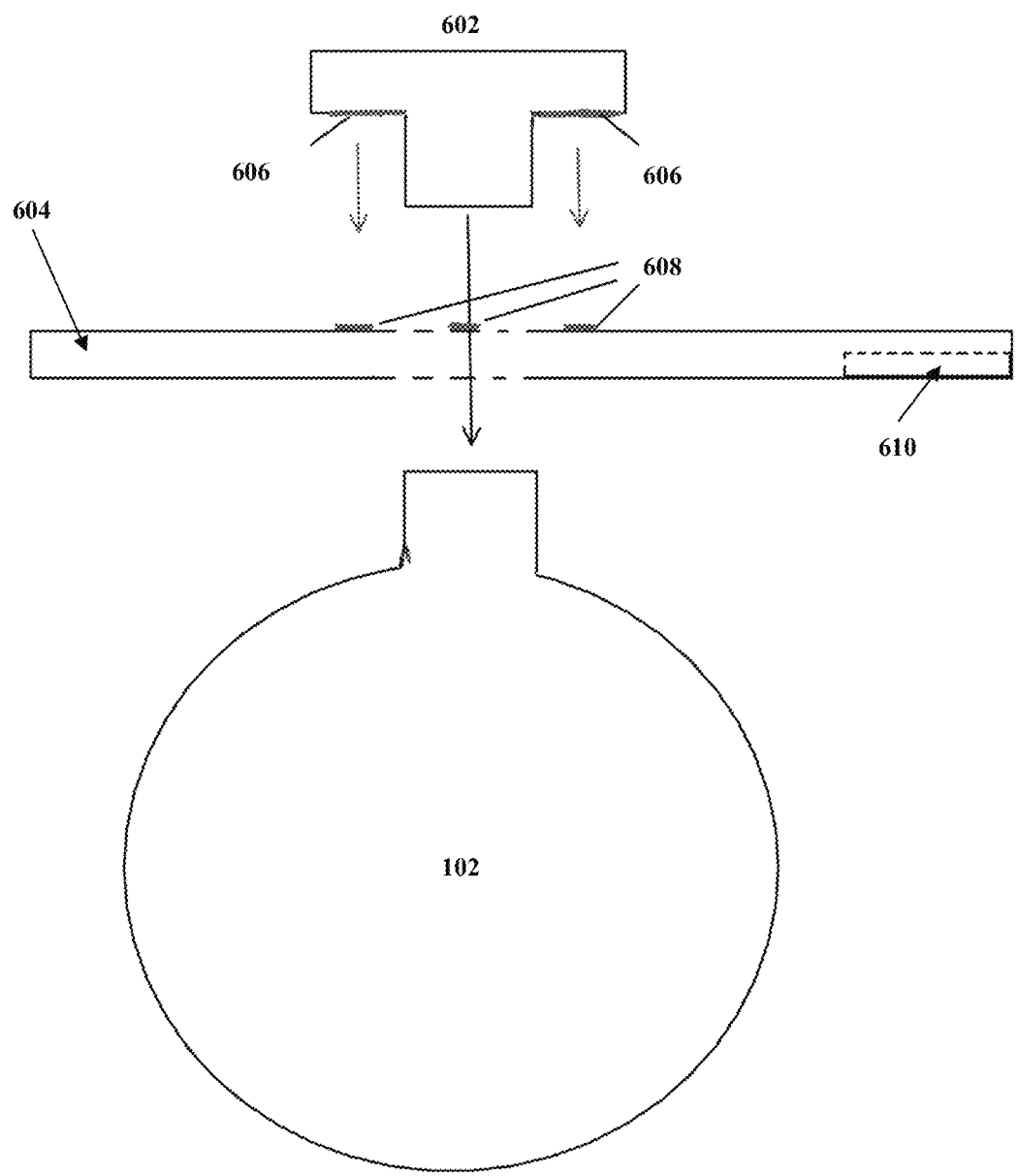
FIG. 6 shows a top view illustration of the proposed door knob components, according to an exemplary embodiment of the invention.
Figure 7:
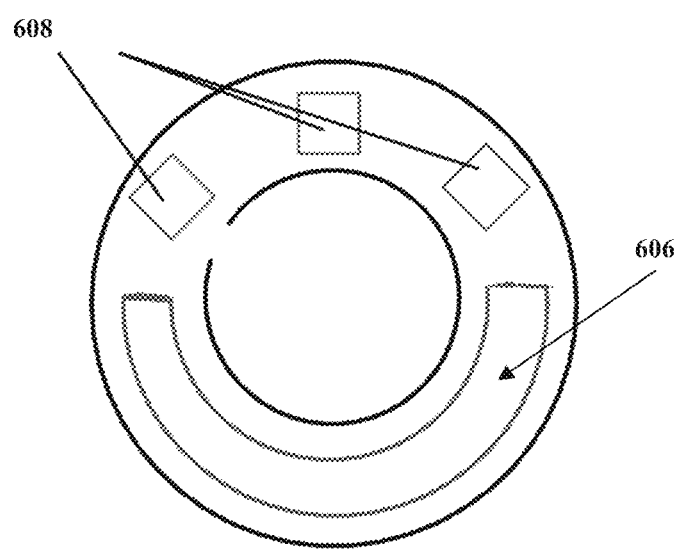
FIG. 7 shows a front view illustration of the electrical contact components, according to an exemplary embodiment of the invention.
Figure 8:
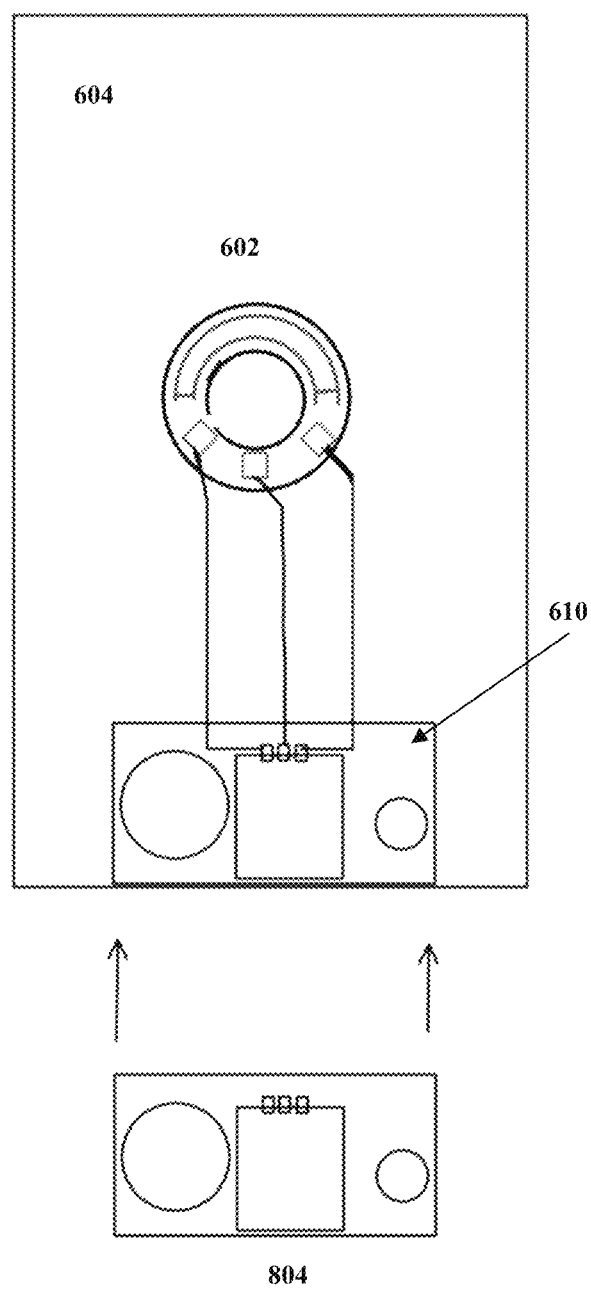
FIG. 8 shows a front view illustration of system components, according to an exemplary embodiment of the invention.

Referring to FIGS. 6-8 we see an alternative embodiment of the invention's activation, rotation detection and rotation speed mechanisms, one which utilizes a mechanical rotation switch to activate the unit's electronics. An electrical connection mechanical switch contact assembly is comprised of a first portion 602 and a second portion 604, wherein said first portion is mechanically linked to the door knob 102, and said second portion 604 is attached to said door frame (such as the rose insert or similar fixed door portion 106), so that the knob 102 rotation results in rotation of said switch's first portion 602 and contact between one or more of the first 602 and second portion 604 contacts 606/608 resulting in circuit activation. When not in contact, after a capacitor circuit has discharged (said circuit being charged upon contact) and/or after a programmable/fixed amount of time has passed, the above allows for the complete shutdown of the system, allowing for the saving of battery power and/or of other energy sources. This prevents the battery from slowly draining.

In one embodiment, the second portion (body) 604 has within it three contacts 608 designed to make varying types of contact with the first portion (rotating) contact 606. In operation, rotation of the knob (one way or the other) connects the 'outside' of the three contacts 608 with the first portion contact, powering the unit electronics (by closing the circuit with the unit's battery/power supply), as well as informing the unit of the direction of rotation. Then, when the center contact 608 comes in electrical and/or mechanical contact with the rotation portion 606 the unit may play one or more sounds, depending on the direction or rotation, as well as on the speed of rotation (based on the time it took to travel from power up to said middle contact 608 with 606).

Said rotation powers up the unit electronics (be they permanent 302 and/or partial/completely removable for insertion within said slot 610), so that closing the 606 to 608 connects the positive contact and one of the receptors; closing the circuit and activating and/or powering up the electronics. In one embodiment, when the mechanism closes a capacitance mechanism charges and allows the interactive process to complete. The average speed is calculated or assumed by measuring the time the circuit is closed after power up.

In one embodiment, the switch assembly non-rotating components and system electronics 302/604 are completely housed in a body or chassis 604 affixed to the door frame. In another embodiment, all or parts of the system electronics 302 (including batteries, speakers, electronics or sound generation circuits) are housed within an electronic assembly designed to fit within one or more electronic removable media slot 610. These may include such format as USB, Secure Digital (SD) cards (including SD, MiniSD, MicroSD, xD and other similar formats), as well as a format. In this fashion, the user may load new types of sounds/programs into the unit, recharge/replace the unit battery, etc. The bay 610 may be accessible to the exterior of the door frame, and be located along the edge of the door (near the door latch), or on the inside of the door (under the knob).

In one embodiment, the device has all the electronic components of the device with exception of the switch, which would be installed on 604. The printed circuit board 804 contains contacts that connect to the switch assembly 604 as well as the contacts 606/608 once it is introduced into the socket 610. Batteries would be easily changeable and different versions of the electronics 804 with multiple sounds could be introduced with ease. In this fashion, portable electronic media would fit to any knob without limiting itself to any external design in particular.

Figure 9:
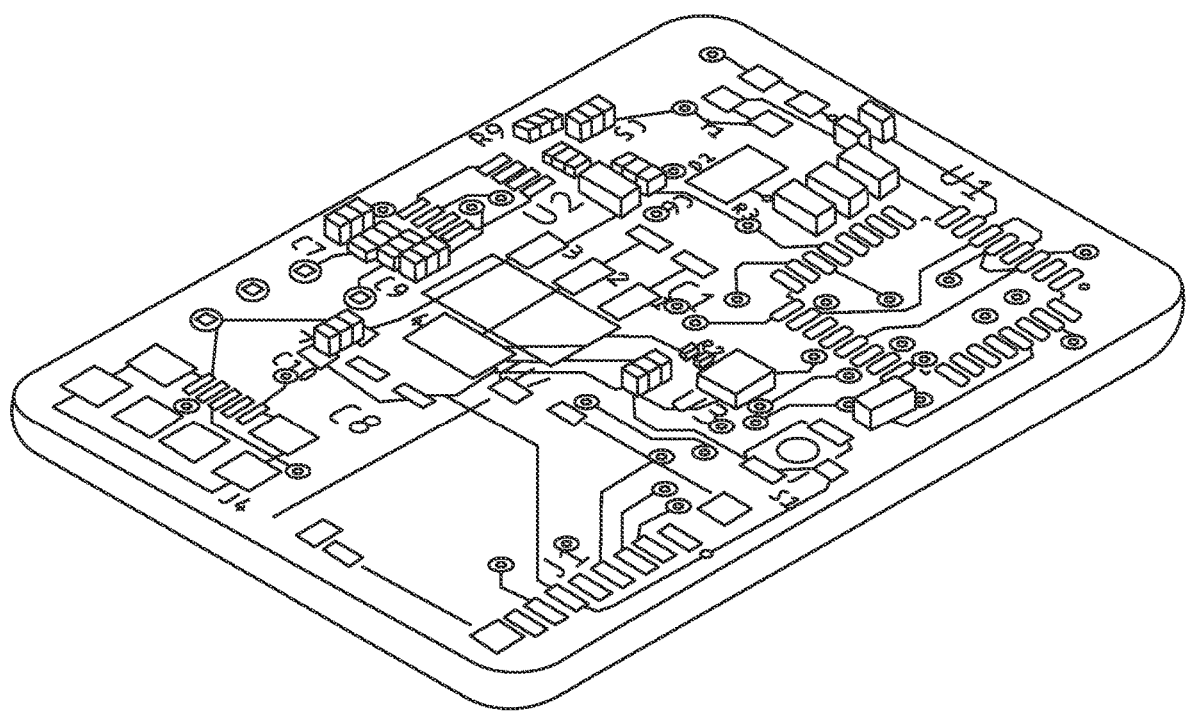
FIG. 9 shows an isometric view of the unit's Printed Circuit Board (PCB), according to an exemplary embodiment of the invention.
Figure 10:
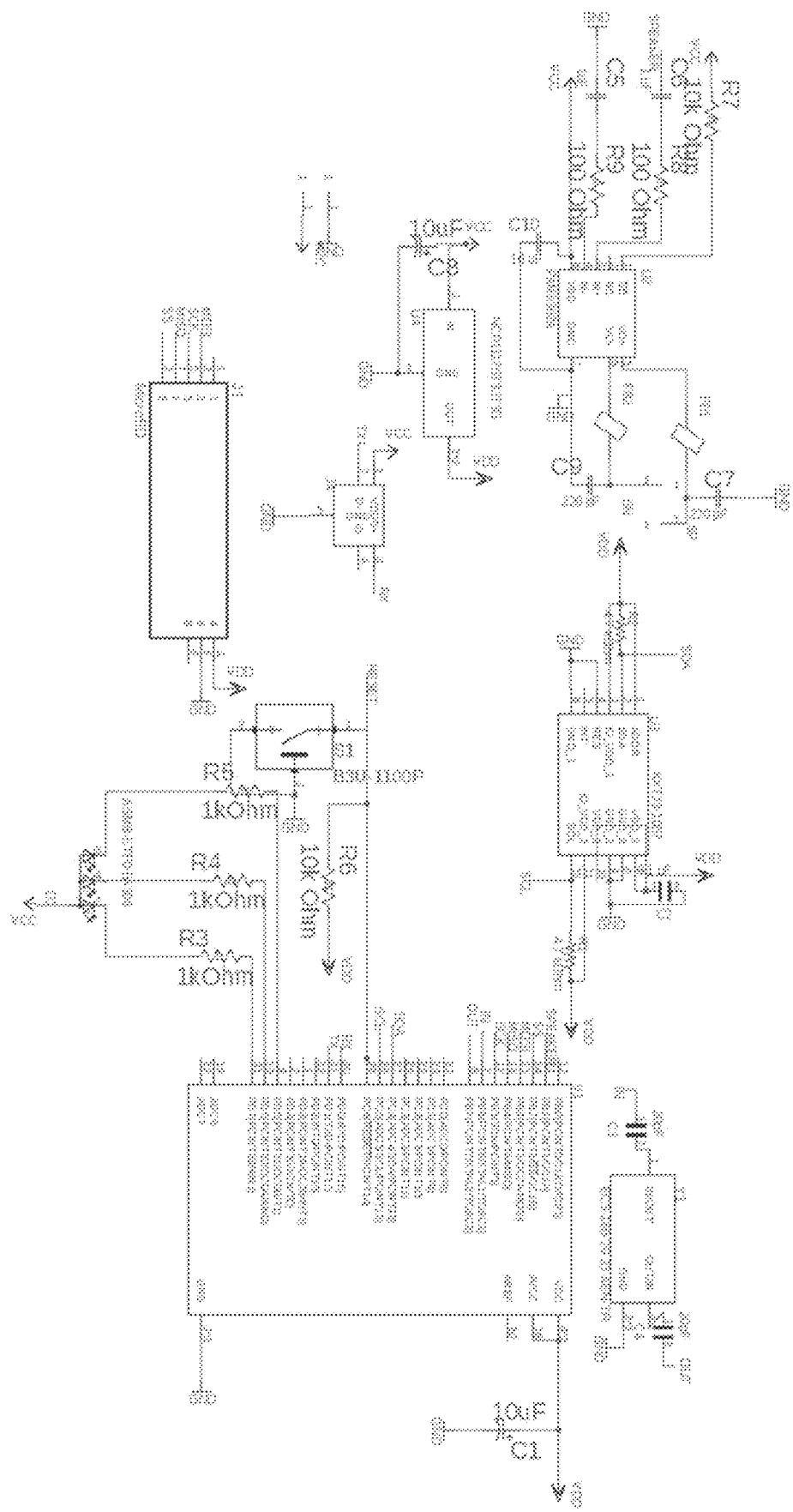
FIG. 10 shows a schematic of the system electronics, according to an exemplary embodiment of the invention.

Referring to FIGS. 9-10, we see an embodiment using an accelerometer mechanically connected to the knob 102 rotation. A unit, such as the Kionix KXTJ3-1057 or similar is electrically powered and connected to a PCB 900 (in one embodiment), so that rotation of the door knob 102 (both rotation and rate of rotation) may be collected. The system is then capable of playing a sound/light action based on the detected knob 102 motion.

In one embodiment, the accelerator acts as a knob rotation component which allows the knob 102 motion to activate the system. At the same time, placing thresholds on such movement, allows for additional capabilities. A minimum angle rotation (i.e. do not activate for less than 15 deg. of rotation), would allow for the sounds/lights NOT to be activated if someone bumps into the door accidentally.

Similarly, measuring the rate of rotation through the accelerometer (accomplished by other electronics that include a Central Processor Unit (CPU)), allows for someone to open the door (while preventing sound/light activation) by slowly rotating the knob 102 and opening the door. Such a mode is considered priceless by ANYONE who has had a toddler in their home.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

The invention claimed is:
1. A door knob assembly comprising;
a knob;
a spindle or shaft connected to said knob, said spindle extending through a deadlatch mechanism for door latch actuation;
knob rotation sensing components comprised of an accelerometer and electronics components capable of detecting both the rotation of said knob and said knob rate of rotation, and integrating said rate of rotation of said knob; and
a power source.
2. The door knob assembly of claim 1 wherein;
said electronic components activate the sound features of the system when said knob is rotated past a certain angle and/or when said knob is rotated at a rate faster than a predetermined rate.
3. The door knob assembly of claim 2 wherein;
said knob is equipped with Light Emitting Diodes (LEDs) and/or speakers driven by said activation stage electronic component's activation, so that power up and direction of rotation may be used by the system electronics in generating one or more pre-determined audio and/or visual responses.
4. The door knob assembly of claim 3 wherein;
all or parts of the system electronics are housed within an electronic assembly designed to fit within one or more electronic removable media slot.

* * * * *